HYDROSTATIC PRESSURE SET WELL PACKER

Original Filed June 27, 1962 3 Sheets-Sheet 1

CHUDLEIGH B. COCHRAN
JOHN B. DAVIS
INVENTOR.

BY

ATTORNEY

HYDROSTATIC PRESSURE SET WELL PACKER

Original Filed June 27, 1962 3 Sheets-Sheet 2

CHUDLEIGH B. COCHRAN
JOHN B. DAVIS
INVENTOR.

BY

ATTORNEY

HYDROSTATIC PRESSURE SET WELL PACKER

Original Filed June 27, 1962 3 Sheets-Sheet 3

CHUDLEIGH B. COCHRAN
JOHN B. DAVIS
INVENTOR.

BY

ATTORNEY

United States Patent Office

Re. 26,379
Reissued Apr. 23, 1968

26,379

HYDROSTATIC PRESSURE SET WELL PACKER

Chudleigh B. Cochran and John B. Davis, Houston, Tex., assignors to Cicero O. Brown, Houston, Tex.

Original No. 3,180,419, dated Apr. 27, 1965, Ser. No. 205,603, June 27, 1962. Application for reissue July 18, 1966, Ser. No. 573,139
20 Claims. (Cl. 166—120)

Matter enclosed in heavy brackets [ ] appears in the original patent but forms no part of this reissue specification; matter printed in italics indicates the additions made by reissue.

This invention is directed to hydraulic pressure-set well packers and more particularly to such well packers which employ the hydrostatic head of fluid in the well to set the packer.

Conventional hydraulic packers require pressure pumps at the surface or explosive devices for actuating the packers. Other types of packers require manipulation of an operating string which is usually tubing, which must be rotated or raised or lowered to actuate the packer.

It is a primary object of the present invention to eliminate the need for extraneous means which are used with hydraulic packers, and to limit any external manipulation of the packer, as by an operating string, in order to actuate the packer.

It is a principal object of this invention to provide a hydraulic pressure-actuated packer which employs the hydrostatic head of a column of fluid in the running string to actuate the packer.

A more specific object is to provide a packer actuatable by the hydrostatic head pressure in the running string and employing the action of a weighted member dropped through the operating string to open communication between the hydrostatic head of fluid in the operating string and the packer actuating elements.

A further object is to provide a packer actuatable by the hydrostatic head of fluid in the operating string and which is releasable by manipulation of the operating string.

An important object is to provide a packer employing setting means actuatable by the hydrostatic head pressure of the fluid column inside the running string, and including means for balancing external fluid pressures across the setting means.

An additional object is to provide a packer employing a hollow setting piston operable by the hydrostatic head pressure inside the running string to actuate the packer and connected to a second balancing piston constructed and arranged to balance the external fluid pressures across the setting piston.

Other and more specific objects and advantages of this invention will become apparent from the following detailed description when read in conjunction with the accompanying drawing which illustrates a useful embodiment in accordance with this invention.

Figure 2:
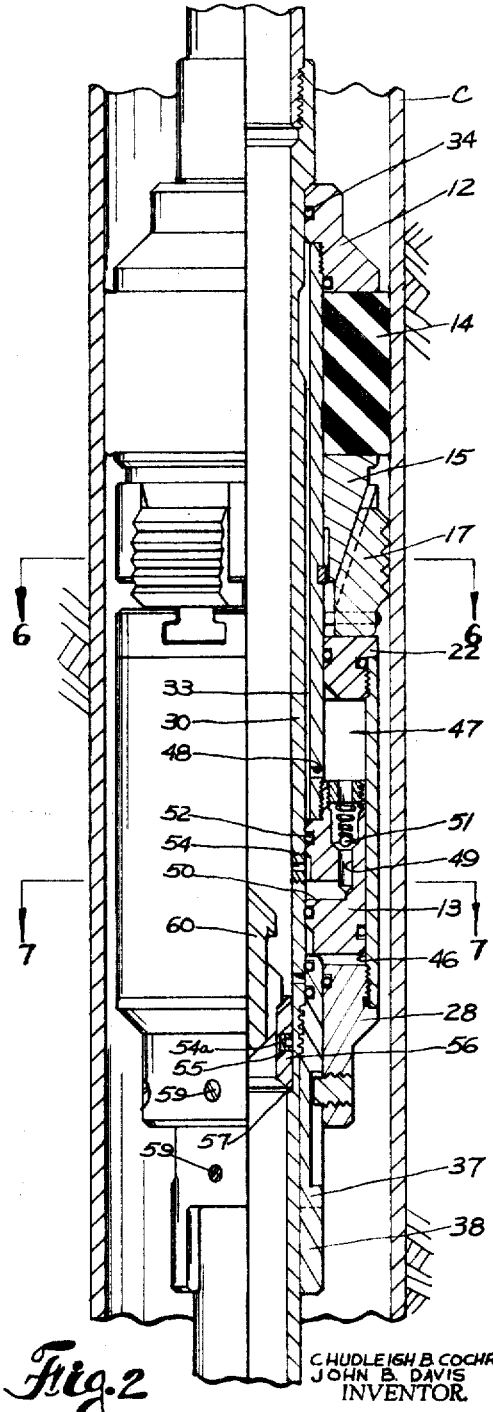
FIG. 2 is a view similar to FIG. 1, showing the packer in actuated or set position.
Figure 4:
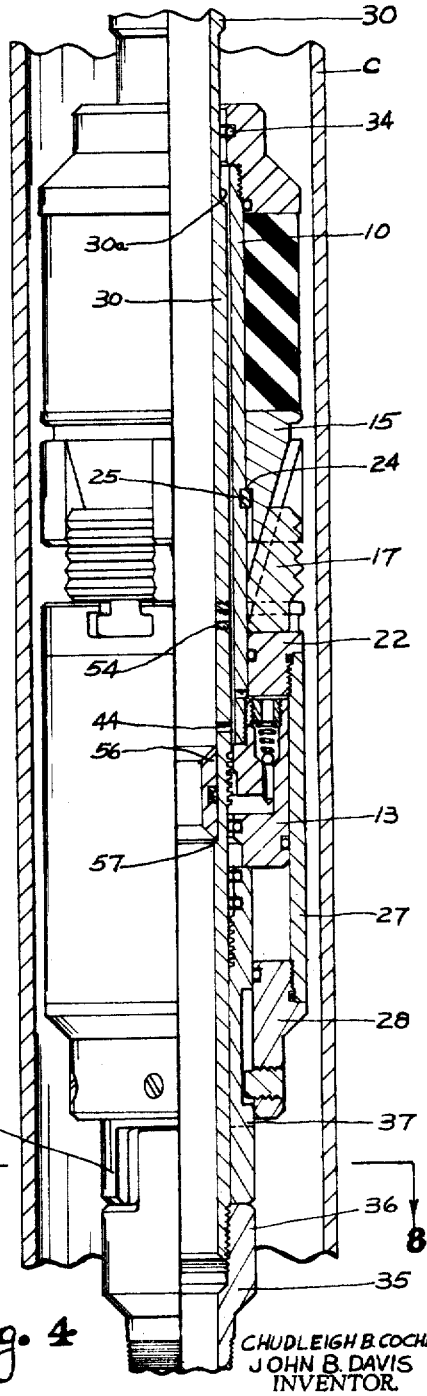
Figure 7:
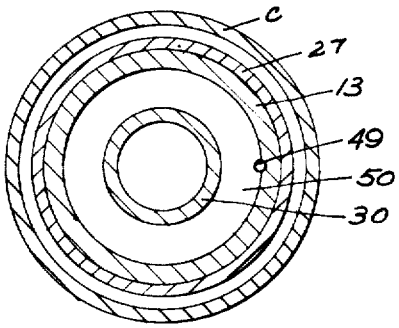
Figure 5:
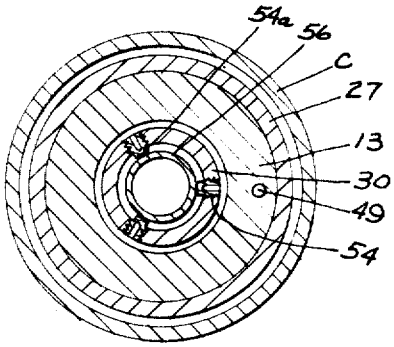
FIG. 5 is a cross-sectional view taken along line 5—5 of FIG. 1.
Figure 8:
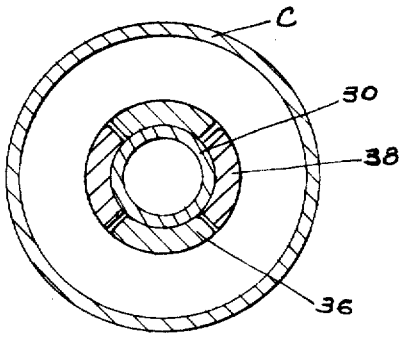
Figure 6:
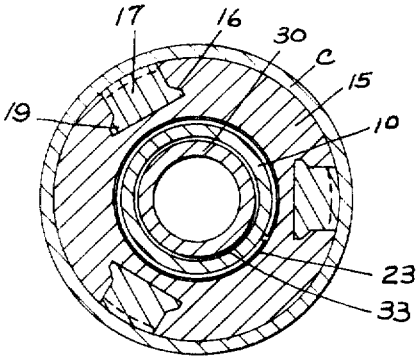

FIGS. 6 and 7 are cross-sectional views taken, respectively along lines 6—6 and 7—7 of FIG. 2;

FIG. 8 is a cross-sectional view taken along line 8—8 of FIG. 4; and

Figure 1:
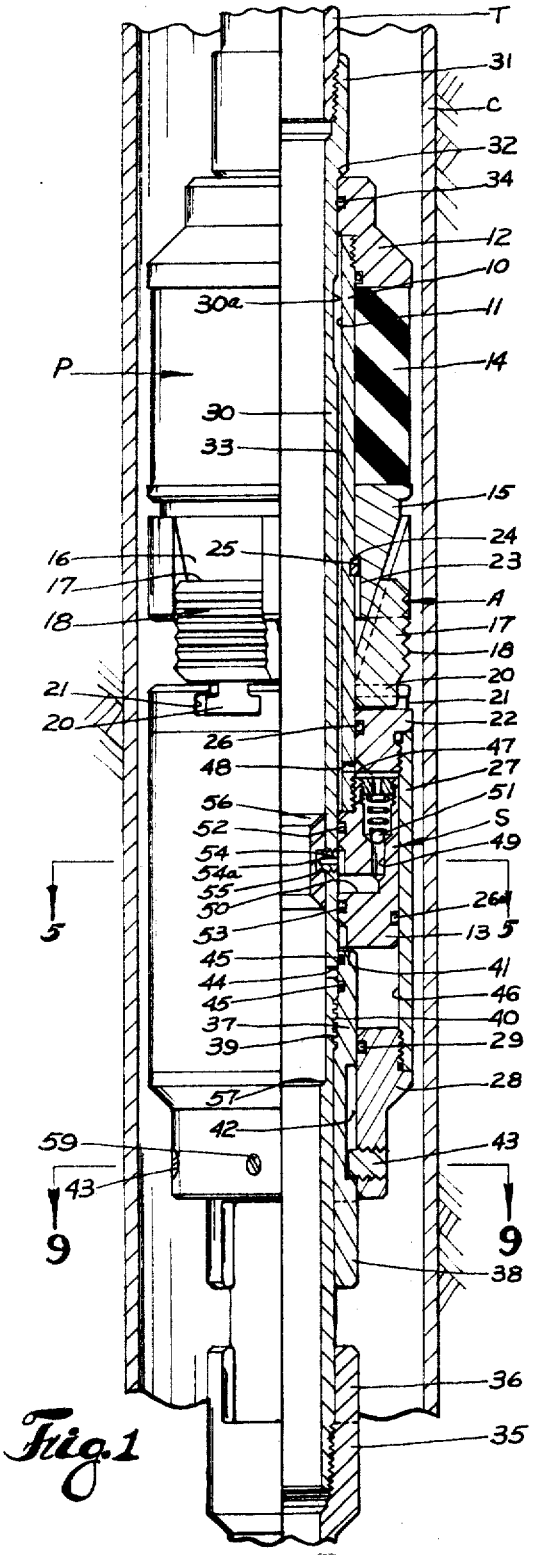
FIG. 1 is a longitudinal quarter-sectional view of the packer in accordance with the illustrative embodiment of this invention, the packer being shown in the unset position as it is run into a well bore.
Figure 9:
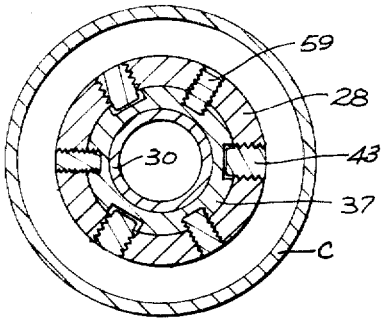

FIG. 9 is a cross-sectional view taken along line 9—9 of FIG. 1.

Referring to the drawing, the device is shown inserted into the bore of a well casing C and comprises a packer, designated generally by the letter P, including a tubular body 10 having bore 11. The upper end of packer body 10 is threadedly received in a collar 12 and the lower end of body 10 is threadedly received in an annular cylinder head 13. A seal-and-anchor assembly A is mounted about body 10 between collar 12 and cylinder head 13. Assembly A includes an annular seal element 14, of conventional flexible resilient construction, which is slidably mounted about the exterior of body 10, having its upper end in abutting relation to collar 12 and its lower end in abutting relation to a slip expander element 15 which cooperates with wedge slips 17 for anchoring the packer. Expander element 15 has a plurality of angularly spaced downwardly and inwardly tapering dovetailed slots 16 adapted to slidably receive wedge slips 17 which have toothed outer faces 18. Slips 17 are provided with laterally extending ribs 19 (FIG. 6) receivable in complementary grooves in the sides of dovetail slots 16 to secure the slips to the expander element, while permitting relative longitudinal movement between the slips and the expander element. The lower ends of slips 17 are provided with conventional T-heads 20 receivable in correspondingly shaped slots 21 carried by the upper end of an annular piston 22 slidably mounted about the exterior of body 10. Piston 22 forms a movable abutment engageable with the lower end of the anchor assembly A and forms part of an actuating assembly S which is adapted, in response to actuation by hydraulic pressure as will be subsequently described, to urge slips 17 longitudinally and radially over expander element 15 into anchoring engagement with the well bore, and which at the same time will axially compress seal element 14 against collar 12 to likewise radially expand seal element 14 into engagement with the wall of casing C. The bore of expander element 15 is counterbored from its lower end at 23 to provide an internal downwardly facing shoulder 24 cooperable with a snap ring 25 mounted in the exterior of body 10 to form an externally projecting shoulder which will be abuttable with shoulder 24 in a stage of operation of the device, as well appear hereinafter.

A seal ring 26 is mounted in the bore of piston 22 to provide a fluid-tight slidable seal between the piston and the exterior of body 10. Actuating assembly S includes a cylindrical skirt 27 threadedly secured to the exterior of piston 22 and extending slidably over the exterior of cylinder head 13. The length of skirt 27 is such that it extends below the lower end of cylinder head 13 and is threadedly secured to a tubular cylinder cap 28. A seal ring 26a is mounted in the exterior of cylinder head 13 to provide a slidable seal between skirt 27 and cylinder head 13. Other elements of actuating assembly S will be described hereinafter.

A tubular mandrel 30 extends slidably through bore 11 of the packer body and has considerably greater length than the packer. The upper end of mandrel 30 is provided with an internally threaded box 31 adapted to be connected to the lower end of an operating tubing string T. The lower end of box 31 forms an external shoulder 32 about the upper end of the mandrel which is engageable with the upper end of collar 12 to limit inward or downward movement of the mandrel relative to the packer. An annular space 33 is provided between the exterior of mandrel 30 and the wall of bore 11 of the packer body. A seal ring 34 is positioned in the bore of collar 12 to form a fluidtight slidable seal with the exterior of mandrel 30 at the upper end of the packer structure. An annular recess 30a is provided in the exterior of mandrel 30 a short distance below shoulder 32, for purposes which will appear hereinafter.

The lower end of mandrel 30 extends substantially below the lower end of the packer and is threadedly received in the bore of a jar sub 35 having a plurality of upwardly extending angularly spaced fingers 36. A jar collar 37, having downwardly projecting fingers 38 complementary to fingers 36, is disposed about the exterior of mandrel 30 below cylinder head 13. Mandrel 30 is provided with a short section of external left-hand threads 39 at a point a short distance below cylinder head 13, and jar collar 37 is provided with a section of internal threads 40 at a point a short distance below its upper end which mate with threads 39. When jar collar 37 is threadedly engaged with the mandrel, as shown in FIG. 1, the upper end of the jar collar forms an upwardly facing shoulder 41 limiting the downward movement of the packer body relative to mandrel 30. Thus, in the position shown in FIG. 1, packer P will be held in a stationary position on mandrel 30 between shoulders 32 and 41. Jar collar 37 is provided with one or more longitudinal slots 42 extending over a portion of its exterior from a point just below threads 40 to a point just above fingers 38 and will be positioned opposite cylinder cap 28, the latter being provided with inwardly projecting pins 43 which project into slots 42 to permit relative longitudinal movement between jar collar 37 and cylinder cap 28, while preventing relative rotation between these parts and their connected elements. A seal ring 29 is mounted in the bore of cylinder cap 28 to slidably seal with the exterior of jar collar 37 above the upper end of slot 42. Mandrel 30 is provided with radial ports 44 through the wall thereof at a point between threads 39 and the upper end of the jar collar. These ports are normally closed by longitudinally spaced seal rings 45—45 mounted in the bore of jar collar 37 positioned to be located above and below ports 44 when jar collar 37 is threadedly secured to mandrel 30 in the position illustrated in FIG. 1. The portion of the annular space provided between cylinder cap 28 and the lower end of cylinder head 13 and confined by skirt 27 and jar collar 37, forms an air chamber 46 in which air at substantially atmospheric pressure will be trapped when the parts are in the position illustrated in FIG. 1 This chamber is expansible and contractable in response to relative movement between skirt 27 and cylinder head 13, cylinder cap 28 thus effectively forming a second piston, as will appear hereinafter. Ports 44 are positioned to communicate with chamber 46 when jar collar 37 has been retracted relative to mandrel 30 in the operation of the device, as will appear hereinafter.

Actuator assembly S also includes the following elements: The space provided between the upper end of cylinder head 13 and piston 22 forms an expansible pressure chamber 47 which communicates with annular space 33 through one or more radial ports 48 provided through the wall of body 10 at a point just above the upper end of cylinder head 13. Pressure chamber 47 is in communication with the upper end of an inlet passageway 49 vertically disposed in cylinder head 13 and whose lower end communicates with an annular groove 50 provided in the inner wall of cylinder head 13. A back-check valve 51 is mounted in inlet passageway 49 to prevent reverse flow of fluid into passageway 49 from pressure chamber 47. Upper and lower annular seal rings 52 and 53, respectively, are mounted in the bore wall of cylinder head 13 above and below groove 50 and form slidable seals with the exterior of mandrel 30. One or more tubular shear nipples 54 are mounted in the wall of mandrel 30 opposite an extension of groove 50 and have end portions 54a which project into the bore of mandrel 30. End portions 54a are closed and are seated in an angular groove 55 provided in the exterior of a tubular shear sleeve 56 which is slidably disposed in the bore of the mandrel. The projection of the outer ends 54a of shear nipples 54 into groove 55 serves to initially secure the shear sleeve in the bore of mandrel 30 in the position illustrated in FIG. 1. Seals 52 and 53 will also serve to seal off between cylinder head 13 and mandrel 30 above and below shear nipples 54 when the parts are in the position occupied in FIG. 1. Shear nipples 54 are designed so that the projecting portions 54a will be sheared off when a gravity-propelled weighted member or "go-devil" 60 is dropped through tubing T and the bore of mandrel 30 to strike the upper end of shear sleeve 56. The impact of the weighted member on the shear sleeve will function, upon shearing off projecting ends 54a of the shear nipples, to move the shear sleeve downwardly, thereby opening communication through the thus broken shear nipples between the bore of mandrel 30 and groove 50, as illustrated in FIG. 2. A landing shoulder 57 is provided in the bore of mandrel 30 at a point below ports 44 to stop the downward movement of the shear sleeve and the go-devil. To prevent premature setting of the packer as the device is run into the well, one or more shear pins 59 extend radilly through cylinder cap 28 into jar collar 37. These pins will be broken upon actuation of the device, as will appear hereinafter.

Operation of the device is as follows: The packer in the unset position shown in FIG. 1, will be run through casing C to the point at which the packer is to be set. As is common, the well bore will usually be filled with drilling mud, salt water or other well fluids, and as the packer is run into the well, the fluid will enter the bore of tubing T and rise therein to the height of the column of fluid in the casing. The fluid column in tubing T will provide the required hydrostatic head necessary to actuate the packer, as will appear subsequently. Generally, several thousand feet of fluid will ordinarily be present in the well, depending, of course, upon its depth, and in most cases the packer, in accordance with this invention, may be effectively set when the column of fluid in tubing T above the packer is one to two thousand feet or more in length. The hydrostatic head thus available will be determined by the density of the fluid in the tubing and the height of the column. For rough computations, the fluid will be calculated as providing a pressure of about one-half pound per square inch per foot.

When the packer has been lowered to the setting point, weighted member or go-devil 60 will be dropped through the fluid in the tubing string and its impact upon shear sleeve 56 will break the shear nipples 54 and drive the shear sleeve downwardly to land on shoulder 57, as shown in FIG. 2. This will open communication through the shear nipples to inlet passage 49 and permit the hydrostatic fluid to flow through inlet passage 49 into chamber 47 where the hydrostatic head will act on piston 22 urging the latter upwardly under the thus applied hydrostatic pressure and breaking shear pins 59. The pressure of the fluid column in the casing annulus on the seal-and-anchor assembly will be equalized, since it will be acting both against piston 22 and against cylinder cap 28 which have equal effective areas and the pressure across this assembly will, therefore, be balanced. As a result, the hydrostatic pressure of fluid in tubing T will be opposed only by the pressure of the air inside chamber 46. Since the air in this chamber is at atmosphere pressure and is compressible, the resistance thus offered will be negligible in comparison with the pressure of the fluid head in tubing T.

As the pressure is exerted against piston 22, the latter will move upwardly and will urge slips 17 outwardly over expander element 15, and this upward force will at the same time act through expander element 15 against the lower end of seal element 14 to comress the latter against the fixed abutment formed by collar 12. This compression will expand the seal element radially into sealing engagement with the wall of casing C, while slips 17 will be forced into tight-gripping engagement with the wall of casing C and the packer will thereby be set. Go-devil 60 may then be withdrawn and the bore of the tubing string opened to production or other operations as may be required.

It will be evident that the pressure fluid entering pressure chamber 47 will be trapped therein by back check valve 51, and while this pressure will also flow through ports 48 into annular space 33, the pressure will likewise be trapped therein by seal ring 34 in collar 12 and upper seal ring 52 in cylinder head 13. The packer will thus be held in its set position until it is desired to release the packer for withdrawal from the well. Back check valve 51 provides a safety feature in this operation in that should the fluid pressure in the bore of tubing T drop below an effective setting pressure, back check valve 51 will retain the previously introduced pressure in chamber 47 and thereby maintain the packer in its set position.

Figure 3:
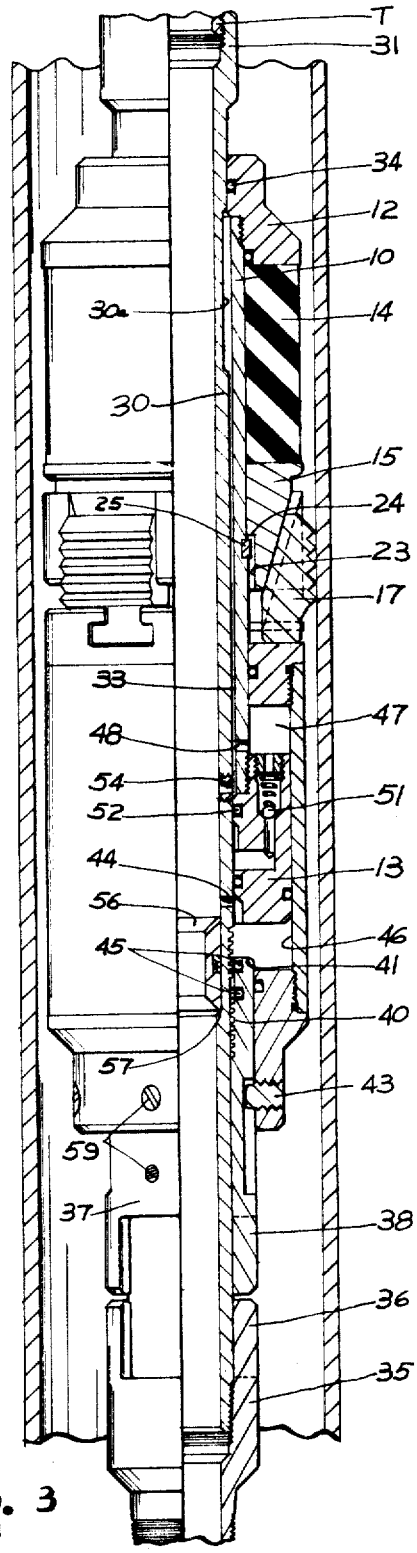
FIGS. 3 and 4 are views similar to FIGS. 1 and 2, but showing the parts of the packer at two stages during release of the packer.

To release the packer, the tubing string will be rotated to the right, thereby rotating mandrel 30, the packer being held stationary by engagement of slips 17 and seal element 14 with the wall of casing C. This rotation will uncouple the left-hand thread connection comprising threads 39 and 40 between mandrel 30 and jar collar 37, and this will allow the mandrel to move upwardly relative to the other portions of the set packer. As the mandrel moves upwardly relative to the jar collar and the threads have been completely uncoupled, as illustrated in FIG. 3, ports 44 will be drawn upwardly past seals 45, placing the bore of mandrel 30 in communication with chamber 46. At the same time, the ports provided by shear nipples 54 will be moved above upper seal 52 and will thereby place the bore of mandrel 30 in communication with chamber 47 through ports 48 and annular space 33, thereby equalizing the pressures in chambers 46 and 47.

When the pressures in the two chambers are thus equalized, the forces operating against the upper and lower ends of cylinder head 13 will also be equalized, thereby releasing the force which is holding seal element 14 in axial compression. The release of this compressive force will permit seal element 14 by reason of its resilience, to retract in order to reassume its initial elongate shape, and the force developed by the retraction of the seal element will act upwardly against collar 12 to elevate body 10 by reason of its connection to collar 12 and this movement will cause the parts to assume the positions illustrated in FIG. 3.

Thereupon, in response to further upward movement of the mandrel, fingers 36 of jar sub 35 will be drawn upwardly against the lower ends of fingers 38 on jar collar 37 which will thereby be moved upwardly until shoulder 41 engages the lower end of cylinder head 13. Thereupon, the continued upward movement of the mandrel will draw cylinder head 13 and body 10 upwardly until snap ring 25 abuts shoulder 24. Continued upward pull on the mandrel will then act through the engagement of snap ring 25 with shoulder 24 to draw expander 15 upwardly relative to slips 17 which, by reason of coaction between dovetail grooves 16 and ribs 19, will retract slips 17 out of engagement with the wall of casing C, and thereby effect complete release of the packer, as shown in FIG. 4. The continued upward movement of the mandrel will position recess 30a opposite seal 34 opening space 33 to the casing annulus to equalize the pressures inside and outside the packer.

In a case where the slip expander element has become very tightly wedged into the slips, it may be necessary to use the jar mechanism provided by jar sub 35 and jar collar 37 to effect release of the packer. This operation is effected by raising mandrel 30 until the ends of fingers 36 abut the ends of fingers 38. Continued upward pull will bring the shoulder 41 up against cylinder head 13 and then will introduce tension into the tubing string which is then slowly rotated, thereby rotating the jar sub relative to jar collar 37. As the fingers are thereby moved angularly out of alignment, fingers 36 will slide upwardly into the spaces between fingers 38, and, as a result of the tension previously introduced into the operating string, will be subjected to a rapid upward acceleration such that when the upper ends of fingers 36 strike the bottoms of the slots between the fingers 38, a severe jarring blow will occur which will be transmitted through cylinder head 13, body 10, snap ring 25 and shoulder 14 to expander member 15, thereby driving the latter upwardly relative to the slips. The inter-engagement of the jar portions is shown in FIG. 4.

When the packer has been fully released, as described, it may be withdrawn from the well as the tubing string is withdrawn.

Instead of dropping a weighted go-devil for breaking the shear nipples, a conventional wire line string of tools employing a set of jars may be employed to drive the shear sleeve downwardly so as to break the shear nipples.

It will be understood that numerous changes and modifications may be made in the details of the illustrative embodiment within the scope of the appended claims, but without departing from the spirit of this invention.

What we claim and desire to secure by Letters Patent is:

[1. A hydrostatic pressure-set well packer comprising, a tubular body connectible into a pipe string containing a column of hydraulic fluid, an annular radially expandible anchor-and-seal assembly slidably mounted about the body, a fixed abutment member and a longitudinally movable abutment means mounted about the body on opposite sides of said assembly, said movable abutment means being operable in response to hydraulic pressure from within said body to actuate said anchor-and-seal assembly, initially closed inlet passage means providing hydraulic fluid pressure communication between the bore of said body and said movable abutment means, means operable from within the bore of said body to open said inlet passage means to communication with hydrostatic pressure of said column of fluid, and means mounted on the body cooperating with said movable abutment means constructed and arranged to balance external fluid pressures across said movable abutment means.]

2. A hydrostatic pressure-set well packer, comprising, a tubular body connectible into a pipe string containing a column of hydraulic fluid, an annular radially expandible anchor-and-seal assembly slidably mounted about the body, a fixed abutment member and a longitudinally movable abutment means mounted about the body on opposite sides of said assembly, said movable abutment means being operable in response to hydraulic pressure from within said body to actuate said anchor-and-seal assembly, said movable abutment means comprising a sleeve piston and means cooperating therewith to define an expansible pressure chamber about said body, initially closed inlet passage means providing hydraulic fluid pressure communication between the bore of said body and said pressure chamber, means operable from within the bore of said body to open said inlet passage means to communication with hydrostatic pressure of said column of fluid, and means mounted on the body cooperating with said movable abutment means constructed and arranged to balance fluid pressures externally of said packer across said movable abutment means.

3. A hydrostatic pressure-set well packer according to claim 2, wherein said last-mentioned means comprises a second piston secured to said sleeve below said cylinder head and defining therewith a second expansible pressure chamber filled with air at atmospheric pressure, said pistons having substantially equal external pressure-actuatable areas.

4. A hydrostatic pressure set well packer, comprising, a tubular body connectible into a pipe string containing a column of hydraulic fluid, an annular radially expandible anchor-and-seal assembly slidably mounted about the body, a fixed abutment member and a longitudinally movable abutment means mounted about the body on opposite sides of said assembly, said movable abutment means being operable in response to hydraulic pressure from within said body to actuate said anchor-and-seal assembly, said movable abutment means comprising an annular setting piston slidably sealing about the exterior of the body, a tubular piston skirt disposed about the body having one end secured to said piston, a second annular piston slidably sealing about the exterior of the body secured to the opposite end of said skirt, an annular cylinder head fixed to said body between said pistons and having slidable sealing engagement with said skirt, initially closed inlet passage means providing hydraulic fluid pressure communication between the bore of said body and the portion of said skirt between said cylinder head and said setting piston means operable from within the bore of said body to open said inlet passage means to communication with hydrostatic pressure of said column of fluid, the portion of said skirt between said cylinder head and said second piston being filled with air at atmospheric pressure and said pistons having substantially equal external opposed pressure actuatable areas whereby to balance fluid pressures externally of said packer across said movable abutment means.

5. A hydrostatic pressure set well packer, comprising, a tubular body connectible into a pipe string containing a column of hydraulic fluid, an annular radially expandible anchor-and-seal assembly slidably mounted about the body, a fixed abutment member and a longitudinally movable abutment means mounted about the body on opposide sides of said assembly, said movable abutment means being operable in response to hydraulic pressure from within said body to actuate said anchor-and-seal assembly, said movable abutment member comprising first and second longitudinally spaced annular pistons slidably sealing about said body, said first piston member being operably engaged wtih said anchor-and-seal assembly, a tubular cylinder secured to both pistons, an annular cylinder head fixed to the body between said pistons and having slidable sealing engagement with the wall of said cylinder to define first and second expansible pressure chambers between the cylinder and said first and second pistons respectively, initially closed inlet passage means providing hydraulic fluid pressure communication between the bore of said body and said first pressure chamber, said second pressure chamber being filled with air at substatially atmospheric pressure, means operable from within the bore of said body to open said inlet passage means to communication with hydrostatic pressure of said column of fluid, said first and second pistons having substantially equal external opposed pressure actuable areas whereby to balance fluid pressures externally of said packer across said movable abutment member.

6. A hydrostatic pressure-set well packer, comprising, a tubular body, an annular anchor-and-seal assembly slidably mounted on the body, a fixed abutment member and a longitudinally movable abutment member mounted about the body on opposite sides of said assembly, said movable abutment member comprising a sleeve piston member and means cooperating therewith to define an expansible pressure chamber about the body operable in response to hydraulic pressure to radially expand said anchor-and-seal assembly into gripping and sealing engagement with the wall of a well bore, inlet passage means communicating said chamber with the bore of said body, a tubular mandrel slidably extending through the bore of said body and adapted to be connected into a pipe string containing a column of hydrostatic fluid, means releasably connecting the mandrel to said body, seal means sealing between the mandrel and said body above and below said inlet passage means, initially closed port means through the wall of said mandrel positioned to communicate the bore of the mandrel with said inlet passage means between said last-mentioned seal means, means operable from within the bore of said mandrel to open said port means whereby to communicate the pressure of said column of hydrostatic fluid into said expasible pressure chamber to actuate the packer, and means mounted on the body connected with said movable abutment member constructed and arranged to balance fluid pressures externally of said packer across said movable abutment member.

7. A well packer according to claim 6 wherein said last-mentioned means comprises an expansible pressure chamber containing air at atmospheric pressure, the external opposed pressure actuable of said movable abutment member and said pressure chamber being substantially equal.

8. In a well packer according to claim 6, check valve means in said inlet passage means disposed to prevent reverse flow of fluid from said chamber.

9. A well packer according to claim 6, wherein said means for opening said port means is a gravity-propelled body dropped through said pipe string.

10. A hydrostatic pressure-set well packer, comprising, a tubular body, an annular anchor-and-seal assembly slidably mounted on the body, a fixed abutment member and a longitudinally movable abutment member mounted on the body on opposite sides of said assembly, said movable abutment member comprising a sleeve piston and means defining therewith an expansible pressure chamber about the body operable in response to hydraulic pressure to radially expand said anchor-and-seal assembly into gripping and sealing engagement with the wall of a well bore, inlet passage means communicating said chamber with the bore of said body, a tubular mandrel slidably extending through the bore of said body and adapted to be connected into a pipe string containing a column of hydrostatic fluid, means sealing between the mandrel and said body above and below said inlet passage means, initially closed port means through the wall of said mandrel positioned to communicate the bore of the mandrel with said inlet passage means between said last-mentioned seal means, means operable from within the bore of said mandrel to open said port means whereby to communicate the pressure of said column of hydrostatic fluid into said expansible pressure chamber to actuate the packer, a releasable connection between the mandrel and the anchor-and-seal assembly operable by relative rotation therebetween to release the packer, and means mounted on the mandrel cooperating with said movable abutment member constructed and arranged to balance fluid pressures externally of said packer across said movable abutment member.

11. In a well packer according to claim 10, back flow-preventing check valve means in said passage means.

12. A well packer according to claim 10, wherein said releasable connection comprises a left-hand thread connection between said mandrel and said movable abutment member.

13. A well packer according to claim 10, wherein said means for opening said port means is a gravity-propelled body dropped through said pipe string.

14. A hydrostatic pressure-set well packer, comprising, a tubular body, an annular anchor-and-seal assembly slidably mounted on the body, a fixed abutment member and a longitudinally movable abutment member mounted about the body on opposite sides of said assembly, said movable abutment member comprising a sleeve piston and means defining therewith an expansible pressure chamber about the body operable in response to hydraulic pressure to radially expand said anchor-and-seal assembly into gripping and sealing engagement with the wall of a well bore, inlet passage means communicating said chamber with the bore of said body, a tubular mandrel slidably extending through the bore of said body and adopted to be connected into a pipe string containing a column of hydrostatic fluid, seal means sealing between the mandrel and said body above and below said inlet passage means, port nipples mounted in the wall of said mandrel positioned to communicate the bore of the mandrel with said inlet passage means between said last-mentioned seal means, said nipples having closed frangible end portions projecting into the bore of the mandrel, shear means operably secured to said closed end portions to shear off the latter in response to impactive force applied thereto by a gravity-propelled body dropped through the bore of said mandrel whereby to open said nipples to communicate the pressure of said column of hydrostatic fluid into said expansible pressure chamber, and a second expansible pressure chamber containing air at substantially atmospheric pressure operably secured to said movable abutment member, said second chamber and said movable abutment member having substantially equal external opposed pressure-actuatable areas.

15. In a well packer according to claim 14, back flow-preventing check valve means in said passage means.

16. In a well packer according to claim 14, a releasable connection between the mandrel and the anchor-and-seal assembly operable by relative rotation therebetween to release the packer.

17. A hydrostatic pressure-set well packer, comprising, a tubular body, an annular anchor-and-seal assembly slidably mounted on the body, a fixed abutment member and a stationary annular cylinder head mounted about the body on opposite sides of said assembly, a piston member slidably disposed about said body above said cylinder head and defining a movable abutment member operable in response to hydraulic pressure to axially compress and thereby radially expand said anchor-and-seal assembly into gripping and sealing engagement with the wall of a well bore, a sleeve member secured to said piston and slidably extending about said cylinder head, the space between said piston and said cylinder head confined by said sleeve member defining an expansible pressure chamber to receive said hydraulic pressure, inlet passage means in said cylinder head communicating said chamber with the bore of said body, a tubular mandrel slidably extending through the bore of said body and adapted to be connected into a pipe string containing a column of hydrostatic fluid, seal means sealing between the mandrel and said body above and below said inlet passage means, initially closed port means through the wall of said mandrel positioned to communicate the bore of the mandrel with said inlet passage means between said seal means, means operable from within the bore of said mandrel to open said port means whereby to communicate the pressure of said column of hydrostatic fluid into said expansible pressure chamber to actuate the packer, a second annular piston secured to said sleeve member and slidably disposed about said mandrel below said cylinder head to define an air-filled balancing chamber, the external pressure-actuatable areas of both said pistons being substantially equal and opposite each other, a collar threadedly secured to said mandrel beneath said cylinder head and sealingly engaged by said second piston, means forming a longitudinally slidable non-rotatable connection between said collar and said second piston below said cylinder head, said mandrel being releasable from said collar by rotation relative thereto whereby to release said packer.

18. In a packer according to claim 17, back flow-preventing check valve means in said passage means.

19. In a packer according to claim 17, pressure release ports through the wall of said body communicating said pressure chamber with the annular space between said body and said mandrel at a level above said seal means, and an upper seal means arranged in said annular space above said pressure release ports to close said space, said annular space being openable to the exterior of said packer by relative upward movement of said mandrel upon release thereof from said body.

20. In a packer according to claim 17, a shoulder carried by said mandrel below said collar operable upon release of the mandrel from said collar to be moved upwardly by said mandrel into jarring engagement with said collar.

*21. In apparatus adapted to be set in a well bore: body means; normally retracted means on said body means adapted to be expanded outwardly into engagement with the wall of the well bore; fluid operated means responsive to the hydrostatic head of fluid in the well bore for expanding said normally retracted means outwardly, said fluid operated means having a high pressure side and a low pressure side; means for preventing flow of fluid from said high pressure side upon reduction of the hydrostatic head of fluid in the well bore below the pressure on the high pressure side of said fluid operated means; initially closed passage means adapted to provide simultaneous communication between the fluid in the well bore and said high and low pressure sides of said fluid operated means to permit retraction of said normally retracted means from its outwardly expanded position; and means for opening said passage means.*

References Cited

The following references, cited by the Examiner, are of record in the patented file of this patent or the original patent.

UNITED STATES PATENTS

| | | | |
|---|---|---|---|
| 2,275,935 | 3/1942 | Baker | 166—120 |
| 2,982,358 | 5/1961 | Brown | 166—120 |
| 3,002,561 | 10/1961 | Baker et al. | 166—120 |
| 3,062,291 | 11/1962 | Brown | 166—120 X |
| 2,903,066 | 9/1959 | Brown | 166—119 X |
| 3,080,923 | 3/1963 | Brown | 166—120 |
| 3,098,524 | 7/1963 | Brown | 166—119 X |
| 3,112,796 | 12/1963 | Myers | 166—120 |
| 3,136,364 | 6/1964 | Myers | 166—120 |
| 3,166,127 | 1/1965 | Brown et al. | 166—120 |

DAVID H. BROWN, *Primary Examiner.*

CHARLES E. O'CONNELL, *Examiner.*